(12) United States Patent
Ryhänen et al.

(10) Patent No.: US 8,024,279 B2
(45) Date of Patent: Sep. 20, 2011

(54) RESONATOR

(75) Inventors: Tapani Ryhänen, Cambridge (GB); Mark Welland, Cambridge (GB)

(73) Assignee: Nokia Corporation, Espoo (FI)

( * ) Notice: Subject to any disclaimer, the term of this patent is extended or adjusted under 35 U.S.C. 154(b) by 708 days.

(21) Appl. No.: 12/217,130

(22) Filed: Jun. 30, 2008

(65) Prior Publication Data

US 2009/0327188 A1 Dec. 31, 2009

(51) Int. Cl.
*G06N 5/02* (2006.01)
(52) U.S. Cl. .......................................................... 706/46
(58) Field of Classification Search ...................... 706/46
See application file for complete search history.

(56) References Cited

U.S. PATENT DOCUMENTS

| | | | |
|---|---|---|---|
| 6,557,413 B2 * | 5/2003 | Nieminen et al. | 73/488 |
| 6,744,335 B2 * | 6/2004 | Ryhanen et al. | 333/185 |
| 6,756,795 B2 * | 6/2004 | Hunt et al. | 324/701 |
| 6,803,840 B2 * | 10/2004 | Hunt et al. | 333/186 |
| 7,266,882 B2 * | 9/2007 | Ryhanen et al. | 29/606 |
| 7,791,201 B2 * | 9/2010 | Auciello et al. | 257/759 |
| 7,813,534 B2 * | 10/2010 | Ryhanen et al. | 382/124 |
| 7,829,799 B2 * | 11/2010 | Ryhanen et al. | 174/560 |
| 7,915,973 B2 * | 3/2011 | Zettl et al. | 333/186 |

OTHER PUBLICATIONS

Slow light in silicon nano-waveguide, Fangfei Liu; Optical Fiber Communication and Optoelectronics Conference, 2007 Asia Digital Object Identifier: 10.1109/AOE.2007.4410906 Publication Year: 2007, pp. 643.*

Using encapsulated MEMS resonators to measure evolution in thin film stress, Qu, Y.Q.; Melamud, R.; Kenny, T.W.; Solid-State Sensors, Actuators and Microsystems Conference, 2009. Transducers 2009. International Digital Object Identifier: 10.1109/SENSOR.2009.5285931 Publication Year: 2009, pp. 1138-1141.*

"Synchronization of MEMS Resonators and Mechanical Neurocomputing" by Frank C. Hoppensteadt; IEEE Transactions on Circuits and Systems-1: Fundamental Theory and Applications, vol. 48, No. 2, Feb. 2001, pp. 133-138.

"Self-Organisation and Associative Memory" by Teuvo Kohonen (Springer, 1984), p. 146.

* cited by examiner

Primary Examiner — Michael B Holmes

(57) ABSTRACT

At least one resonator is disclosed having a plurality of nanoscale resonator elements, the at least one resonator having at least two, different resonant frequencies and configured to provide at least two signals in response to an input signal and at least two adders configured to weight the signals with respective weights and to add weighted signals so as to produce an output signal.

35 Claims, 12 Drawing Sheets

RESONATOR

BACKGROUND OF THE INVENTION

1. Technical Field

The present disclosure relates to resonator(s).

2. Discussion of Related Art

Some forms of signal processing, such as pattern recognition, data mining and sensor signal processing, involve classifying or categorizing data.

Classifying and categorizing data has been the subject of intensive research for several decades. For example, an audio pattern recognition based on resonators is described on page 146 of "Self-Organisation and Associative Memory" by Teuvo Kohonen (Springer, 1984).

It has been proposed to implement pattern recognition in hardware.

In recent years, machine learning algorithms have evolved for classifying data. These algorithms tend to use digital signal processors and employ mathematical methods based on statistical methods and optimization processes.

An example of classifying data will now be described.

A chemical sensor system or "artificial nose" can be used to identify an odor by measuring concentrations of n different chemicals. The result of a measurement is an n-dimensional vector of measurement values. Recognizing a particular odor involves determining if the n-dimensional vector belongs to a specific cluster of points in n-dimensional space. The system learns to classify these points using certain mathematical rules known as "discriminant functions" which divide n-dimensional space into decision regions.

FIG. 1 illustrates a simple example of a two-dimensional space 1 in which data values 2 are classified into three groups 3 by three discriminant functions 4. Discrimination can be carried out based on a method using a form of discriminant known as a support vector machine (SVM). A discriminant, g(x), is defined in terms of a set of support vectors, $\alpha^t$, and a non-linear Kernel function $K(x^t,x)$, namely:

$$g(x) = \sum_t \alpha^t r^t K(x^t, x) \qquad (1)$$

and where, in this case, a Gaussian radial basis Kernel function $K(x^t,x)$ is used, namely:

$$K(x^t, x) = \exp\left[-\frac{\|x^t - x\|^2}{\sigma^2}\right] \qquad (2)$$

The Kernel function is typically calculated using a digital signal processor using a multiplication unit.

It may be useful for portable devices, e.g. handheld devices or smaller-sized devices, to classify or categorize data. However, these types of devices may have limited-capacity power sources and/or limited computing resources.

SUMMARY OF CERTAIN EMBODIMENTS OF THE INVENTION

According to a first aspect of certain embodiments of the present invention there is provided apparatus comprising at least one resonator comprising a plurality of nanoscale resonator elements, having at least two, different resonant frequencies and being configured to provide at least two signals in response to an input signal, the apparatus comprising at least one adder configured to weight the signals with respective weights and to add weighted signals so as to produce an output signal.

Thus, the apparatus can be used to implement, in the form of transfer functions, Kernal functions of a support vector machine for classifying data and so can be used to classify data by analog data processing which can be more efficient than digital signal processing.

The input signal may be frequency coded and/or may have normalized amplitude. The response signals may be amplitude coded. The input signal may be relatively high frequency and the response signal may be relatively low frequency.

The at least one resonator may comprise a resonator comprising the plurality of nanoscale resonator elements and different parts of the resonator have different resonant frequencies. The resonator may comprise an array of nanoscale resonator elements. The apparatus may comprise at least two bandpass filters configured to extract the at least two signals from an aggregate signal.

The apparatus may comprise at least two resonators, each resonator comprising a plurality of nanoscale resonator elements and each resonator being configured to provide a signal in response to the input signal.

The plurality of nanoscale resonator elements may comprise a plurality of nanowires. The plurality of nanoscale resonator elements may comprise a piezoelectric material, such as zinc oxide or barium titanate.

The plurality of nanoscale resonator elements may comprise a plurality of nanotubes upstanding from a base. The nanotubes may comprise carbon nanotubes.

The plurality of nanoscale resonators may comprise a plurality of two-dimensional conductive sheets, which may comprise graphene.

The or each respective resonator may have a natural resonant frequency and variance. At least one resonant frequency and/or variance may be programmable. The apparatus may comprise a gate configured to apply an electric field to a resonator so as to program the resonant frequency and/or variance. The apparatus may comprise a heater configured to cause change in phase of at least some of the nanoscale resonator elements so as to program the resonant frequency and/or variance.

The apparatus may comprise at least two transmission lines, each transmission line coupled to a respective resonator. The at least two resonators may be configured to receive the same input signal.

The apparatus may further comprise at least one multiplier, each respective multiplier configured to combine signals from at least two resonators and to provide a combined signal to an adder. The multiplier may be a diode multiplier. Each adder may comprise a programmable junction. Each respective adder may comprise a junction between two conductive lines, such as nanowires. The junction may be configured to have a value of coupling constant which is continuously variable. The junction may be configured to have a value of coupling constant which is switchable between at least two discrete values. The junction may include functional molecules. Each adder may comprise of a programmable variable resistor. The values of the or each resistor may determine a respective weight for an adding operation.

According to a second aspect of certain embodiments of the present invention there provided a module comprising at least one input terminal for receiving at least one respective input signal and the apparatus, the apparatus configured to receive the at least one input signal and to output at least one signal classifying the at least one respective input signal.

According to a third aspect of certain embodiments of the present invention there is provided a device comprising a circuit configured to provide a frequency coded signal and a module configured to receive the frequency coded signal and to output a signal classifying the frequency coded signal.

According to a fourth aspect of certain embodiments of the present invention there is provided apparatus comprising a digital processor, a classifier comprising the apparatus and at least one input signal source configured to at least one input signal to the classifier, wherein the classifier is configured to pass an output to the digital processor.

The digital processor may be configured to determine at least one parameter for the classifier. The digital processor may be configured to configure the classifier in dependence upon the at least one classifier.

According to a fifth aspect of certain embodiments of the present invention there is provided apparatus comprising at least one resonating means comprising a plurality of nanoscale resonating means, the at least one resonating means having at least two, different resonant frequencies and being configured to provide at least two signals in response to an input signal, the apparatus comprising at least one adding means configured to weight the signals with respective weights and to add weighted signals so as to produce an output signal.

According to a sixth aspect of certain embodiments of the present invention there is provided a method classifying an input signal using at least one resonator comprising a plurality of nanoscale resonator elements having at least two, different resonant frequencies, weighting the signals with respective weights and adding weighted signals so as to produce an output signal.

The method may further comprise measuring a temperature of a resonator and providing a signal dependent upon the temperature to the resonator

BRIEF DESCRIPTION OF THE DRAWINGS

Embodiments of the present invention will now be described, by way of example, with reference to the accompanying drawings in which.

DETAILED DESCRIPTION OF CERTAIN EMBODIMENTS OF THE INVENTION

Figure 1:
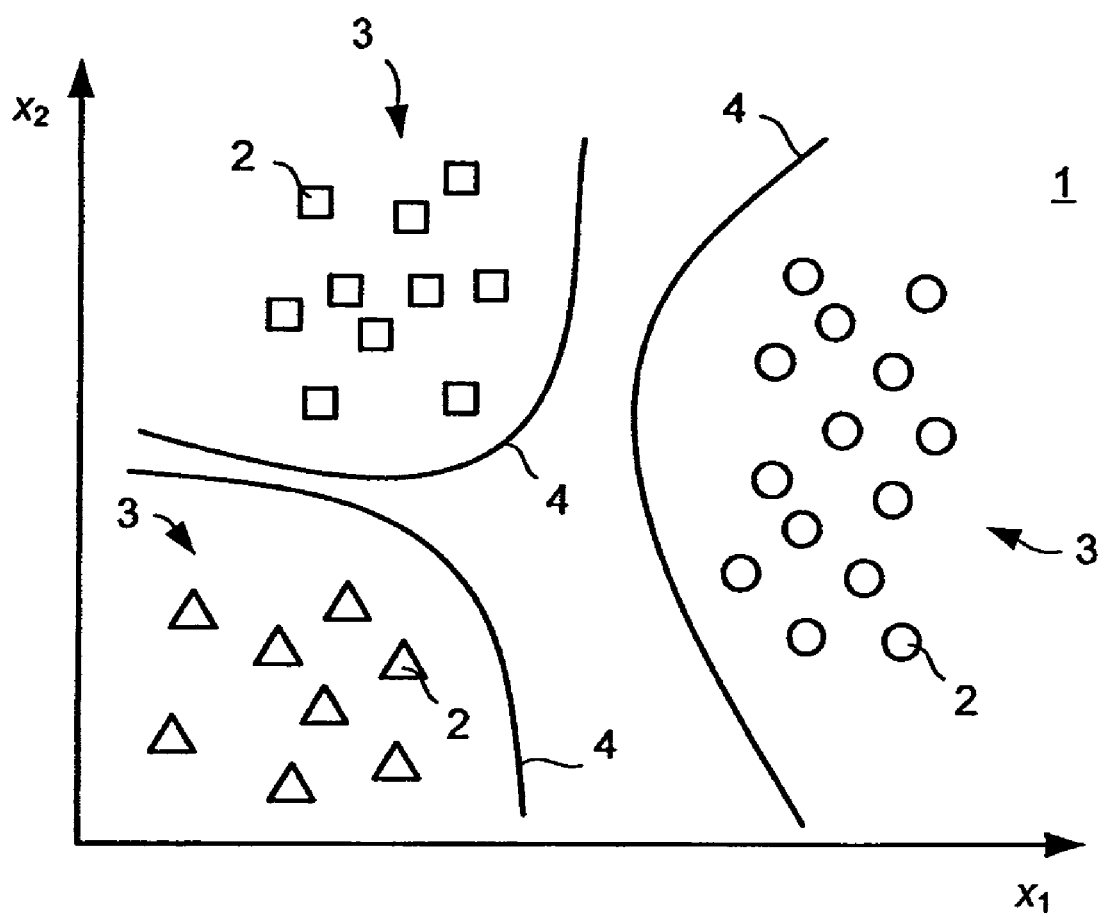
FIG. 1 illustrates decision regions in two-dimensional space.
Figure 2:
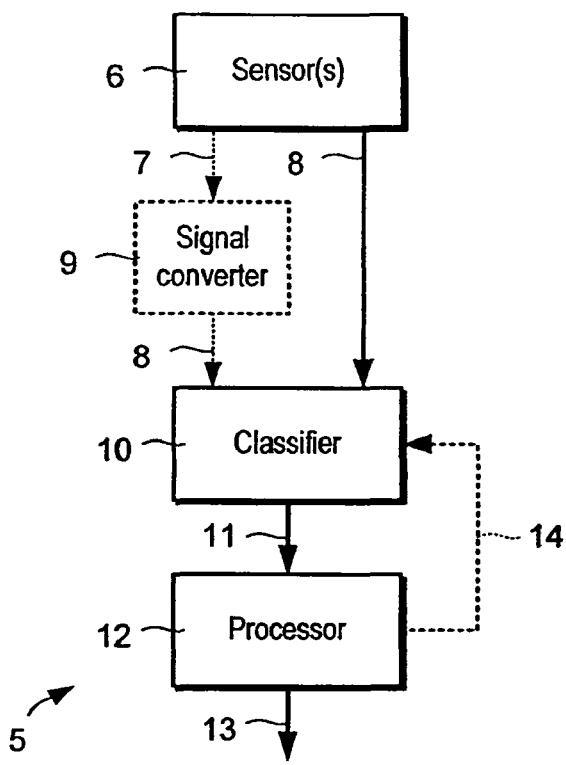
FIG. 2 is a schematic block diagram of apparatus for classifying data in accordance with certain embodiments of the present invention.

Referring to FIG. 2, apparatus 5 for classifying data in accordance with certain embodiments of the present invention is shown.

The apparatus 5 includes an array of one or more sensors 6 for providing raw and/or static or quasi-static signals 7, and/or time-varying signals 8 with normalized amplitudes, an optional signal converter 9 for converting non-normalized and/or (quasi-)static signals 7 into normalized, time-varying signals 8, a classifier 10 classifying the signals 8 and producing classification data 11 and a digital signal processor 12 which produces an output signal 13. The processor 12 may also output one or more parameters 14 which can be fed back into the classifier 10. All, some or none of the sensors 6 may produce normalized, time-varying signals 8. A signal converter 9 may be incorporated into a sensor 6.

The classifier 10 is a support vector machine (SVM) which uses a hypothesis space of linear functions in a high dimensional space to find discriminant functions. The classifier 10 can be trained, for example by the processor 12, with an optimizing, learning algorithm to implement a learning bias.

Figure 3:
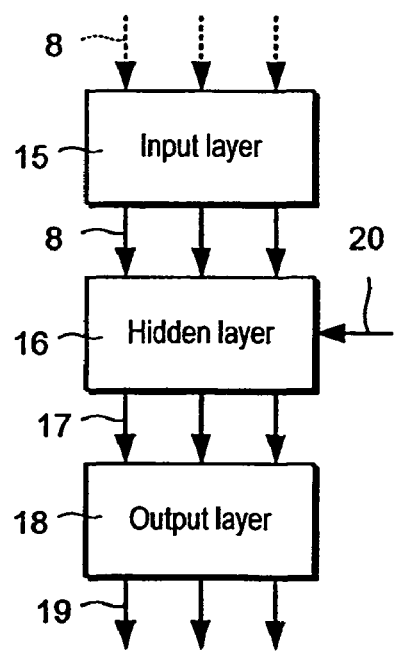
FIG. 3 is a schematic block diagram of a classifier for classifying data in accordance with certain embodiments of the present invention.

Referring to FIG. 3, the classifier 10 comprises an input layer 15 providing sensor signals, a higher-dimensional so-called "hidden layer" 16 which creates a higher-dimensional hypothesis space and produces a plurality of responses 17, an output layer 18 which combines the responses 17 using weights and produces an output 19, and a bias 20 to train weights.

In this example, the input layer 15 includes the sensors 6. However, in some examples, the input layer 15 does not include the sensors 6 and the input layer 15 may, for example, simply serve as an interface. In some embodiments, the input layer 15 provides the signal converter(s) 9.

The hidden layer 16 can take a signal 8 which is frequency coded at a relatively high frequencies and which has normalized amplitude and output a response 17 which is amplitude coded and which has a relatively low frequency or frequencies. For example, the sensor 6 or the converter 9 may output a frequency-modulated square wave of fixed amplitude. The hidden layer 16 outputs a signal a low frequency which is characteristic of the events or environment of interest, such a changes in chemical concentration or changes in context.

Figure 4:
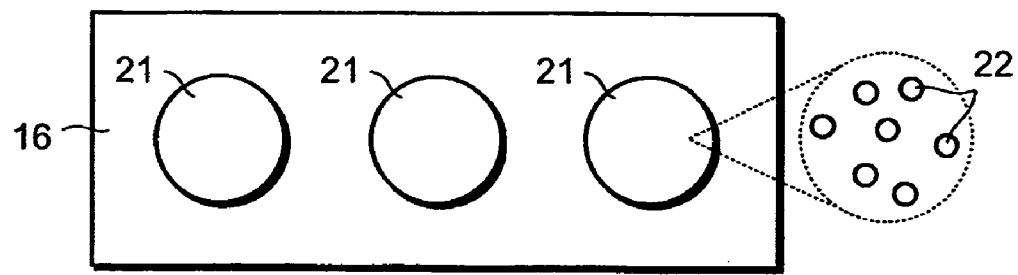
FIG. 4 illustrates a so-called "hidden layer" of a classifier in accordance with certain embodiments of the present invention.

Referring also to FIG. 4, the output, y(x), of the output layer 18 can be defined as:

$$y(x) = \sum_{i=1}^{n} w_i \phi(\|x - c_i\|) \quad (3)$$

where n is the number of units 21 in the hidden layer 16 implementing non-linear transfer functions, $w_i$ are the weights of a summing operation and $\phi$ is a non-linear function of Euclidean distance between an input vector x and a center function $c_i$.

The n-dimensional hidden layer 16 which defines the non-linear functions $\phi(\|x-c_i\|)$ can be implemented using an ensemble of nanoelectromechanical resonator elements (or simply "nanoscale resonator element" or "resonant nanofeatures") 22, such as an array of nanowires. The ensemble or array has a closely-separated group of elements which interact electrically and/or mechanically. The array may be ordered in one (or more) dimensions, for example, by being arranged on the same, e.g. planar, substrate. However, the array need not be periodic or have a period which changes in predefined way, e.g. steadily increasing periodicity, in all or some dimensions.

Figure 5:
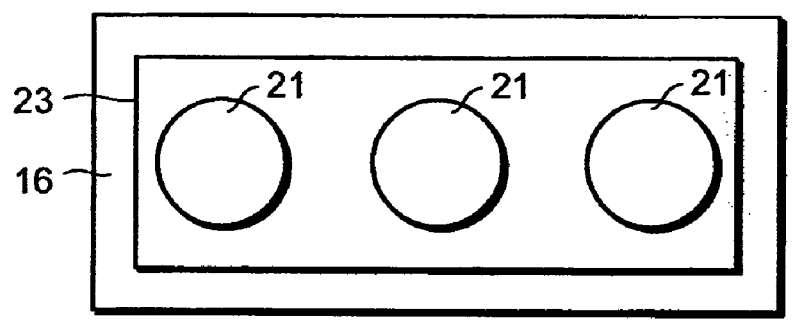
FIG. 5 illustrates an example of implementing all or part of the hidden layer shown in FIG. 4.
Figure 6:
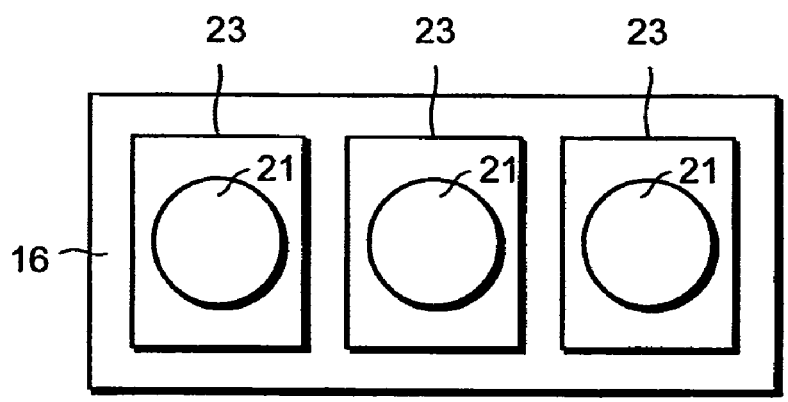
FIG. 6 illustrates another example of implementing all or part the hidden layer shown in FIG. 4.

Referring to FIGS. 5 and 6, the units 21 implementing the non-linear transfer functions can be formed in the same array 23 or different arrays 23. Arrays may be considered to be different, for example, if they are spaced sufficiently far apart, without intermediate resonator elements, and do not substantially interact, e.g. where the arrays of elements are separated by a distance, D, which is much greater (e.g. at least one or two orders of magnitude) than the distance, d, between neighboring elements in an array. In some embodiments, some units 21 may be implemented in the same array and other units 21 may be implemented using other, different arrays 23.

Units 21 have different resonant frequencies. Units 21 can be formed in different parts of the array 23.

Figure 7:
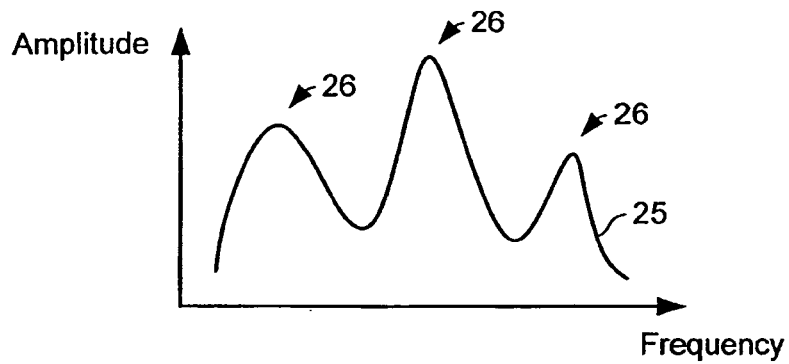
FIG. 7 illustrates a transfer function of the hidden layer shown in FIG. 5.

Referring also to FIG. 7, an ensemble of nanoelectromechanical resonator elements 22 (FIG. 4) which are coupled electrically and/or mechanical can create a transfer function 25 T(ω) having more than one maximum 26. This arises due to non-linearities in electrical and/or mechanical coupling. Thus, a frequency response of a unit 21 depends on (and can be varied by changing), for example, the dimensions, spacing and/or properties of the nanoelectromechanical resonator elements 22.

The ensemble of the nanoelectromechanical resonators 22 can be arranged to define mathematical functions for implementing machining learning algorithms. In particular, in this example, the ensemble of nanoelectromechanical resonators 22 implements a Gaussian Radial Basis function, namely $$\exp\left(-\frac{1}{2}|x_i - x_j|^2 / \sigma^2\right).$$

However, other transfer functions can be used as the function $\phi$ and include a linear function, i.e. $x_i.x_j$, power function, i.e. $(x_i.x_j)^d$, a polynomial function, i.e. $(ax_i.x_j+d)^d$, a sigmoid function, i.e. $\tan h(ax_i.x_j+d)$ function.

The Gaussian Radial Basis function can be implemented using an ensemble 23 of nanoscale mechanical resonators 22 that are coupled to external input signal and that are coupled to weakly together either mechanically or via electromagnetic interaction. If the ensemble consists of individual resonators that are distributed according to a nearly Gaussian distribution, the resonator ensemble synchronizes itself to a collective state. An array of weakly coupled resonators converges to an oscillatory phase-locked pattern, in other words, the oscillators tend to have the same oscillation frequency and constant, but not necessarily equal phase.

Converting the amplitude of a collective resonating state of the ensemble to a low frequency signal generates a mapping:

$$x=(x_1,\ldots,x_n) \mapsto \Phi(x)=(\phi_1(x),\ldots,\phi_N(x)) \quad (4)$$

where x are frequency-based input signals and $\Phi(x)$ are amplitudes of the set of resonator ensembles. There can be more than one isolated resonator ensembles or one resonator ensemble with multiple resonant states. Thus, the hidden layer comprises a set of resonator ensembles that behave according to the Gaussian Radial Basis function:

$$\phi(x) \approx \exp\left(-\frac{\|x - c_j\|^2}{\sigma^2}\right) \quad (5)$$

Figure 8:
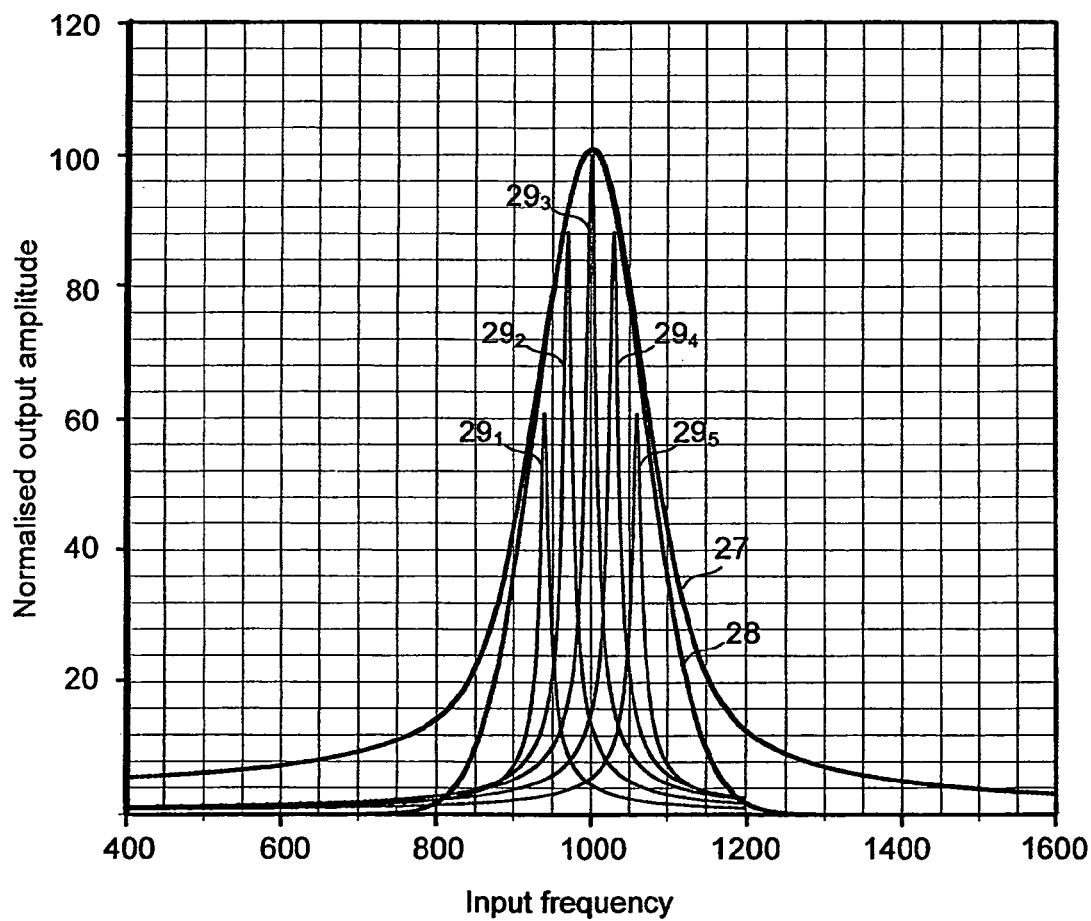
FIG. 8 illustrates a simulation of an ensemble of nanoscale resonators.

Referring to FIG. 8, a simulated Gaussian Radial Basis function 27 based on an ensemble of mechanical nanoscale resonator groups is shown. The simulation is based on five resonators having values of Q of 100 and having discretely Gaussian distributed resonance frequencies at five different resonant frequencies. FIG. 8 also shows an ideal Gaussian function 28 and responses 29$_1$, 29$_2$, 29$_3$, 29$_4$, 29$_5$ of individual resonators.

Summing amplitudes of individual ensembles can be implemented using analog complementary metal oxide semiconductor (CMOS) circuitry, digital CMOS circuitry, nanowire arrays with variable connections between crossing wires and variable resistor networks.

Weights, $w_i$, can be adjusted. The weights can be continuously variable, stepwise variable or binary, i.e. on/off.

Equation (3) above specifies three parameters, namely a function center or "central frequency" $c_i$, the variance of Gaussian function $\sigma_i$ and a weight $w_i$.

Leaving aside the variance $\sigma_i$, learning can be implemented in three different ways, namely dynamically adjusting the weights $w_i$ with the constant function centers $c_i$, dynamically adjusting the function centers $c_i$ with the constant weights $w_i$ or dynamically adjusting both the function centers $c_i$ and the weights $w_i$.

Learning and/or teaching can be based on programming parameter values $w_i$, $c_i$ during the manufacturing and/or dynamically adjusting parameter values $w_i$, $c_i$ during use of the system.

Referring again to FIG. 2, the processor 12, for example in the form of a CMOS-based digital signal processor, can be used to compute and optimize the parameters 14 $w_i$, $c_i$, $\sigma_i$ of the pre-processor, i.e. classifier 10.

This arrangement can have the advantage that calculation of parameters 14, which can take up large amounts of computational and electrical power, can be carried out relatively infrequently using a digital signal processor, whereas classification of sensor signals, which uses less electrical power, can be carried out more frequently using the pre-processor 10. This can help to reduce the overall energy and power consumption of the system.

The parameters 14 need not be computed by the processor 12, but can be implemented by other learning mechanisms using, for example, nanoscale systems. This may include the use of phase changing materials.

Figure 15:
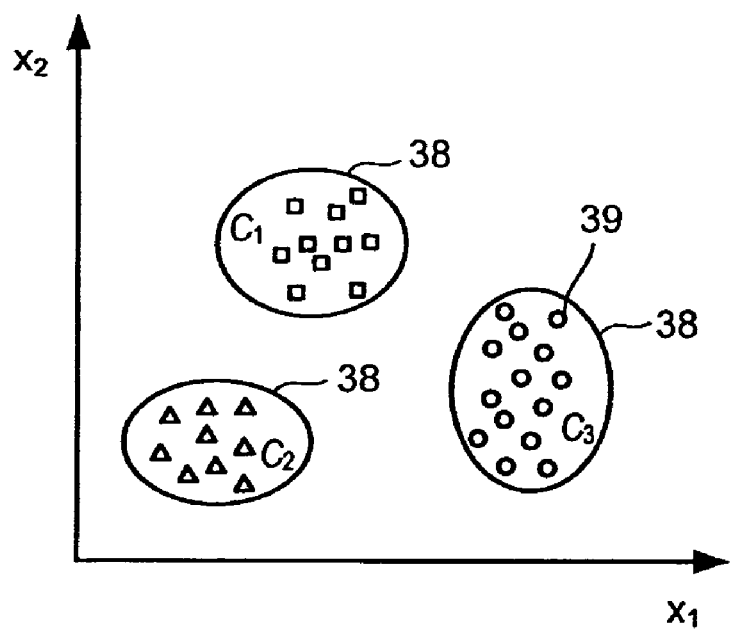
FIG. 15 illustrates a two-dimensional space before classification using the apparatus shown in FIG. 13.
Figure 16:
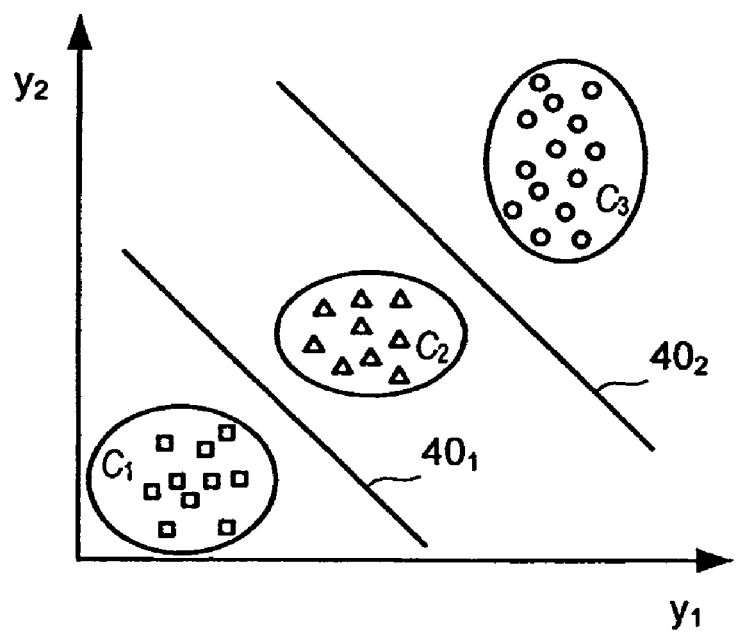
FIG. 16 illustrates a two-dimensional space after classification using the apparatus shown in FIG. 13.

As will be explained later, it may not be possible to separate an initial set of measurement values using a linear classifier, i.e. linear function for separating the data points (for example as shown in FIG. 15). For this reason, the values of the system parameters $w_i$, $c_i$ can be optimized to arrange data points so that they are separable using linear classifier functions (for example as shown in FIG. 16).

Dynamic machine learning algorithms for training the system can be applied as an overlaying structure that controls the system parameters $w_i$ $c_i$.

In an example which uses nanoscale resonator ensembles and crossbar junctions, the resonator ensembles can be tuned by a bias voltage and the values of crossbar junctions can be changed by an additional electrical signal. In another example which uses nanoscale resonator ensembles and CMOS circuitry, the value of weights based on variable resistor networks can be changed in different ways.

Teaching can be based on back propagation from analysis of the output of the system to the values of the controllable elements $w_i$, $c_i$.

Figure 9:
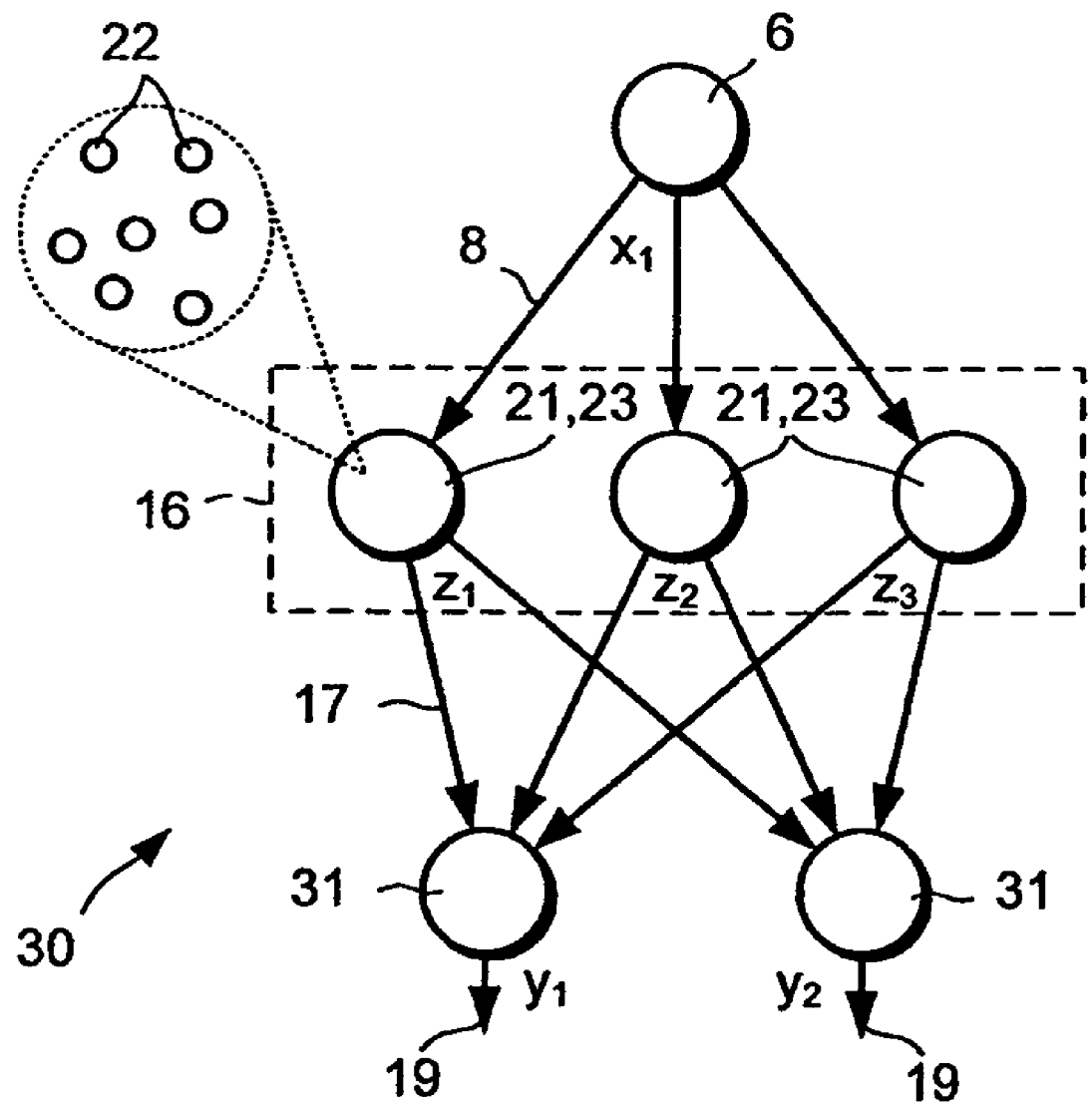
FIG. 9 is a schematic diagram of apparatus for classifying data received from one signal source in accordance with certain embodiments of the present invention.

Referring to FIG. 9, apparatus 30 for classifying data from one source 6 which may be a sensor, a transducer, an antenna or some other form of input device which provides a time-varying signal 8 having one or more frequency components in accordance with certain embodiments of the present invention is shown.

The signal 8 is frequency-modulated signal. However, other forms of coding can be used such as pulse-density coding. In certain embodiments, the signal 8 takes the form of an electrical signal. However, the signal 8 can take the form of an optical, mechanical or thermal signal.

The signal 8 is fed into a set of transfer functions 21 implementing Kernel functions, formed by one or more resonators 23. The or each resonator 23 includes an array (herein also referred to as an "ensemble") of weakly-coupled nanoscale resonator elements 22. The resonator elements 22 have at least one dimension (e.g. width and/or thickness) which is less than about 1 μm, less than about 100 nm or less than about 10 nm. The resonator elements 22 are spaced apart from nearest neighbor(s) by a separation which can be less than about 100 nm, less than about 10 nm or less than about 2 nm.

The resonators 23 can be nanoelectromechanical resonators formed from nanowires, nanotubes, 2-dimensional sheets or other forms of electromechanical nanoscale resonator elements 22. The arrays may be arranged horizontally or vertically with respect to a planar base or substrate.

The resonator elements 22 can be formed from a semiconductor material, metal, metal alloy or metal oxide. The resonator elements 22 may be piezoelectric.

The resonators 23 may be nanoscale optical resonators formed from localized plasmonic resonator elements, quantum dot based resonator elements or other forms of optical nanoscale resonator elements 22.

In relation to FIG. 9, for clarity, each function 21 is implemented by separate arrays 23. However, more than one function 21 can be implemented in the same array 23, in which case a reference to, for example, different resonators 23 can be replaced by a reference to different parts of a resonator 23.

Each respective resonator 23 has a central resonant frequency, $x_{mi}$, and the resonance frequencies of the resonator elements 22 in the same resonator 23 are distributed in a continuous distribution around the central frequency, for example in Gaussian distribution. This can be used to provide an array of Gaussian transfer functions (or physical manifestations of Kernel functions) for signal processing. However, other distributions can be used, for example distributions which are not symmetrical.

Figure 24:
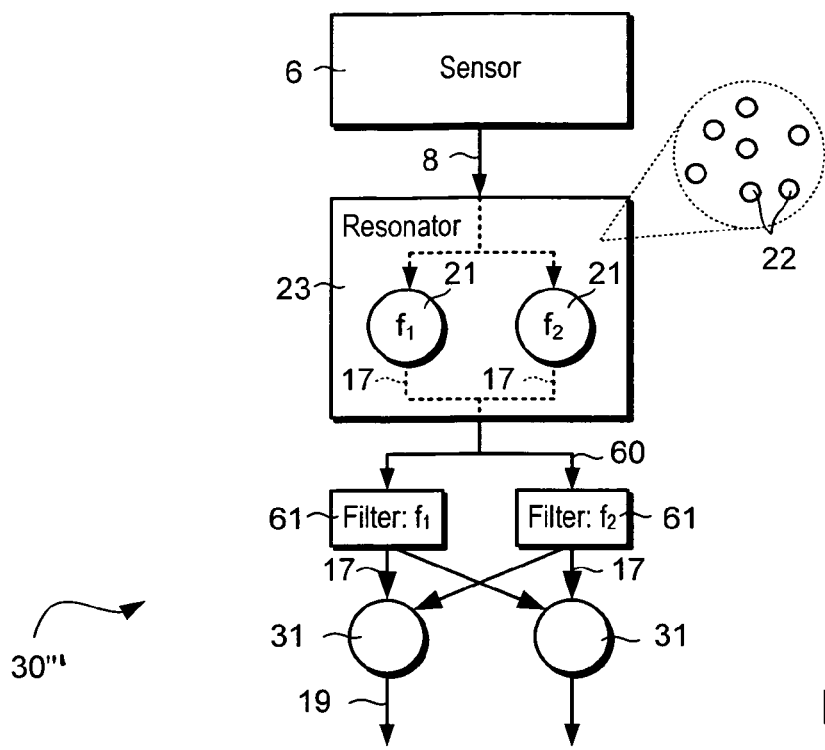
FIG. 24 is a schematic diagram of apparatus for classifying data using one resonator in accordance with certain embodiments of the present invention.

Each resonator 23 produces a response signal 17 which is proportional, e.g. linearly proportional, to the average amplitude of oscillation of the nanoscale resonator elements. In the case that more than one function 21 is implemented in the same array 23, the response signals 17 may be mixed in an aggregate signal 60 (FIG. 24), but can be extracted using band-pass filters 61 (FIG. 24).

The resonator elements 22 have a quality factor, Q, which may be of the order of 100 or 1000. However, the resonator elements 22 may have a lower or a higher quality factor according to the frequency of operation and the required resolution.

For a Gaussian distribution of the resonance frequencies, the response signal 17 for a i-th transfer function 21 can be expressed as $z_i$, where:

$$z_i = \exp\left(-\frac{\|x - \bar{x}_{mi}\|^2}{\sigma^2}\right) \tag{6}$$

where x is the input signal 8, $\bar{x}_{mi}$ is the center of the transfer function 21 and σ is Gaussian variance of the transfer function 21.

As will be explained in more detail later, $\bar{x}_{mi}$ usually corresponds to a resonant frequency of the transfer function 21. If the transfer function 21 is provided by one resonator 23, then the resonant frequency $x_{mi}$ of the resonator 23 is used instead of the average $\bar{x}_{mi}$. However, if the transfer function 21 is provided by more than one resonator 23, for example as shown in apparatus 30' (FIG. 14), then an average resonant frequency $\bar{x}_{mi}$ of the resonators 23 can be used.

The response signals 17 are fed into a set of adders or summing elements 31 in the output layer 18 (FIG. 3) which weight and sum weighted signals to produce output signals 19. As will be explained in more detail later, the array can be implemented using a crossbar structure of nanowires coupled to each other by junctions with variable coupling constants.

The output signal 19 for a j-th adder 31 can be expressed as $y_j$, where:

$$y_j = w_{j1}z_1 + \ldots + w_{j3}z_3 \tag{7}$$

Thus, the apparatus 30 can provide an analog processor for signal processing and, in particular, can be used to classify a signal by implementing the Kernel functions of a support vector machine.

The input device 6 may be a broadband antenna and the apparatus 30 may be used for recognizing the context of a radio environment.

Figure 10:
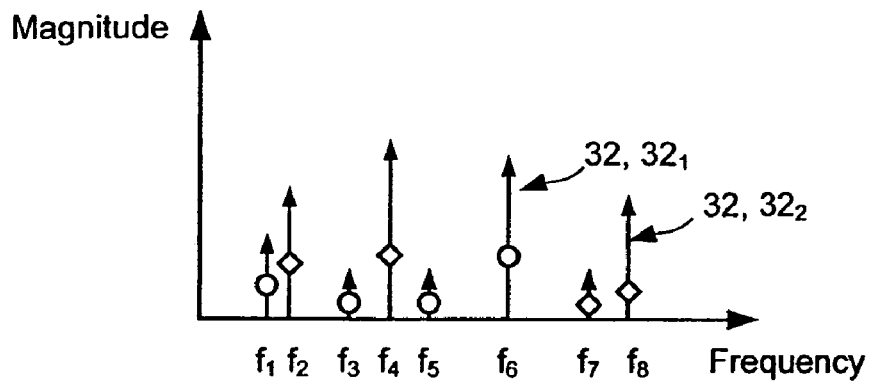
FIG. 10 illustrates frequency components of an input signal.

Referring also to FIG. 10, the signal 8 from the antenna 6 includes several frequency components 32 having different magnitudes. Magnitude can be measured in terms of intensity, amplitude or power. For example, the signal 8 may be radio-frequency spectrum. A first set of frequency components $32_1$ may represent frequency components found in a home environment and second set of frequency components $32_2$ may represent frequency components found in a work environment. The frequency components 32 may comprise components arising from, for example a Bluetooth™ network, wireless local area network (WLAN) etc.

The signal 8 from the antenna 6 is fed into three transfer functions 21 provided by three respective resonators 23. The resonators 23 have respective values of resonant frequency, namely $x_{m1}$, $x_{m3}$ and $x_{m3}$, and respective values of Gaussian variance, namely $\sigma_{m1}$, $\sigma_{m2}$ and $\sigma_{m3}$. The resonators 23 convert the signal 8 into signals 17 that are proportional to the amplitude of oscillation of the resonating elements 22 in the resonators 23.

Figure 11:
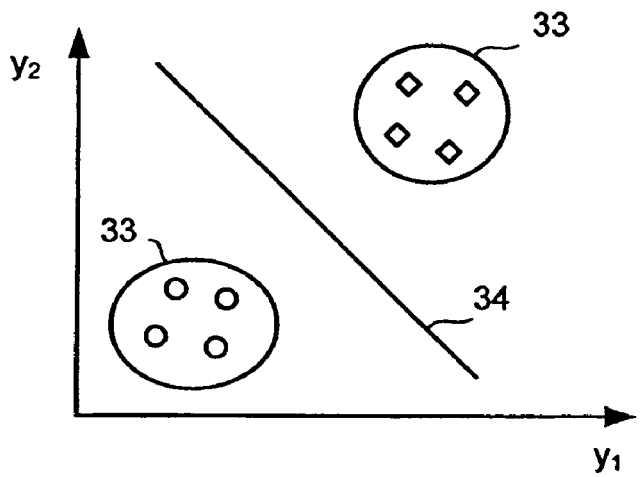
FIG. 11 shows identifying a radio context using the apparatus shown in FIG. 10.

Referring also to FIG. 11, the apparatus 30 resolves the signal 8 into one of a number of different contexts 33, e.g. home or work environment, by classifying the frequency components 32 using a discriminant function 34.

Figure 12:
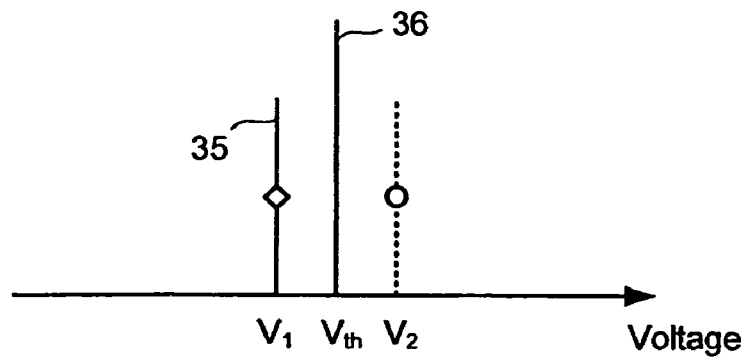
FIG. 12 illustrates an output signal from the apparatus shown in FIG. 10.

Referring also to FIG. 12, the signal 8 can be resolved into a value 35, e.g. voltage, which can be compared with a threshold value 36 and so identify the context.

The signal 8 need not be frequency coded, but can be coded in other ways. For example, the signal 8 can be pulse density coded, employ spike coding or be based on analog voltage. For example, a voltage may be converted by signal converter 9 (FIG. 2) into a frequency. This allows frequency signals to be synthesized. As will be explained later, when using multiple sensors, this technique can be used to combine signals from different types of sensors.

Radio sensing using the apparatus 30, particularly using piezoelectric nanowires, can have advantages. For example, power consumption can be low compared with conventional processor-based circuits. Radio sensing can also occur in real time.

As explained earlier, the apparatus 30 may comprise one source 6 of time-varying input signals 8 and so the transfer function 21 can be provided by one resonator 23.

Figure 13:
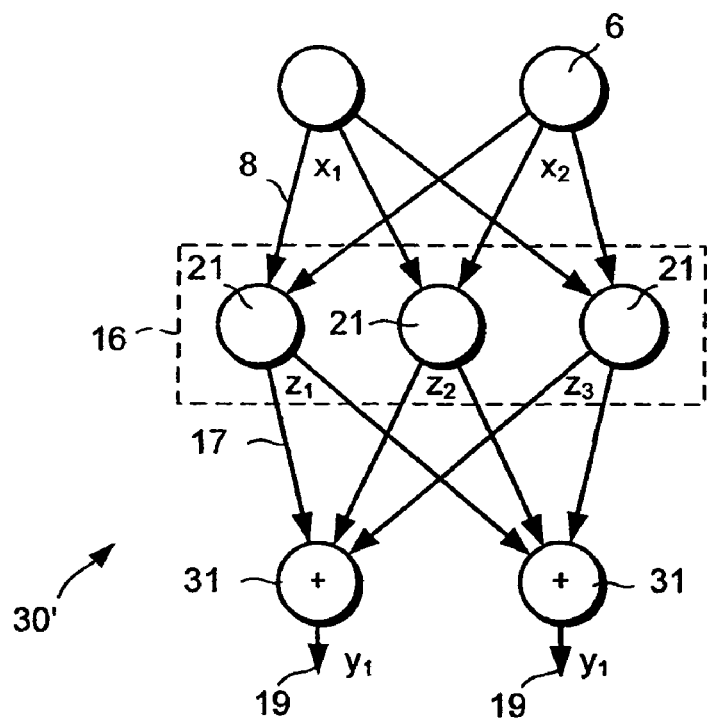
FIG. 13 is a schematic diagram of apparatus for classifying data received from two signal sources in accordance with some embodiments of the present invention.

Referring to FIG. 13, a modified apparatus 30' is shown with two sources 6. The modified apparatus 30' is the similar to the apparatus described earlier and the same reference numerals are used to describe the same features.

In this example, signals 8 from more than one source 6 can be fused into signal analysis. This involves obtaining a value indicative of the similarity of each of the signals 8 to a resonator 23 and multiplying the similarity values.

Figure 14:
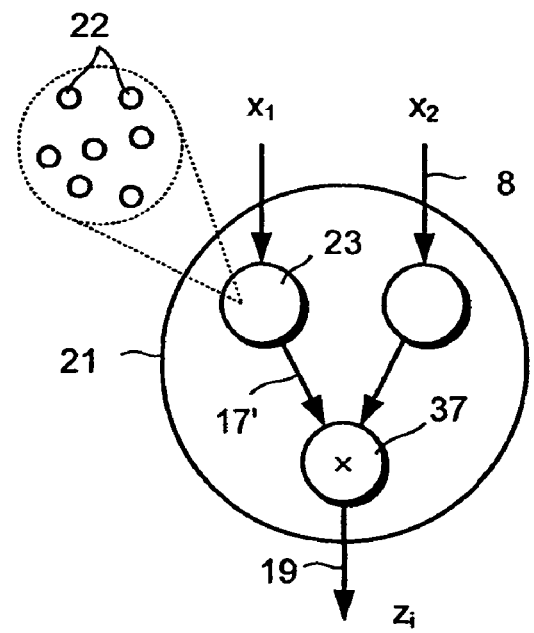
FIG. 14 illustrates a transfer function provided by two resonators in the apparatus shown in FIG. 13.

Referring to FIG. 14, handling signals 8 from more than one source 6 can be achieved by applying the signals 8 to respective resonators 23 (or to a resonator having more than one resonant mode), taking intermediate responses 17' from the resonators 23 (or extracting intermediate responses using band pass filters) and multiplying the intermediate responses 17' using a multiplier 37 to produce the response 19. Thus, the transfer function produces a signal:

$$z_i = \exp\left(-\frac{\|\bar{x} - \bar{x}_{mi}\|^2}{\sigma^2}\right) \quad (6')$$

where $\bar{x}$ is an average of the two of more signals 8. As will be explained in more detail later, the multiplier 37 is provided by a non-linear element, such as a diode multiplier, and can be implemented, for example, as a nanostructured silicon diode.

In the case that more than one transfer function 21 is implemented in the same resonator array 23, different frequency intermediate responses can be extracted using bandpass filters 61 (FIG. 24) and then multiplied as if they came from separate resonator arrays 23.

Multiple signal sources 6 allow a higher (i.e. n>2) dimensional vector of measurement values to be classified.

Referring to FIGS. 15 and 16, the apparatus 30' can receive signals from two sources, such as a temperature sensor and a light intensity sensor, and can resolve pairs of measured signals 8, e.g. temperature and light intensity, into one of a number of different contexts 38, e.g. at home, in an office or outdoors, by classifying measurement pairs 39 using two discriminant functions $40_1$, $40_2$.

There can be more than two signal sources. However, the apparatus 30 can easily be modified to accommodate further signal sources 6 by providing an appropriate number of resonators 23 for each transfer function 21 (or a resonator 23 with an appropriate number of resonant modes) and multiplying intermediate signals 17' from the resonators 23 providing a transfer function 21. For example, if there are three sources 6, then each transfer function 21 is provided by three resonators 23 (or a resonator 23 with three resonant modes).

In the examples described earlier, three transfer functions 21 are illustrated. However, these examples and other examples can use two transfer functions or more than three transfer functions. Adding additional transfer functions 21 allows further dimensions to be analyzed.

Figure 17:
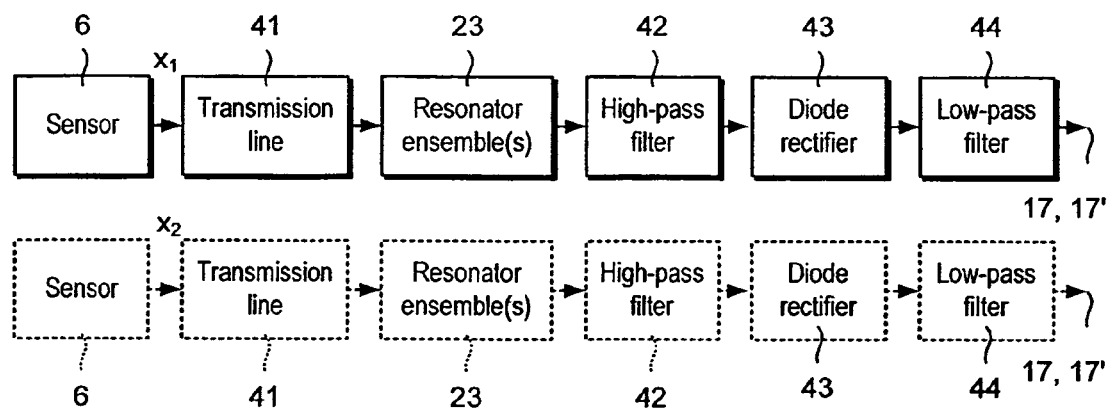
FIG. 17 is a schematic block diagram of signal conditioning and processing circuit.

Referring to FIG. 17, the apparatus 30 will now be described in more detail.

The apparatus 30 includes an antenna or other signal source 6 and a transfer functions 21 formed of a nanoscale resonator ensemble 23. A transmission line 41 feeds the input signal 8 from the sensor 6 to the nanoscale resonator ensemble 23. The signal from the nanoscale resonator ensemble 23 is fed into a high-pass filter 42 into a rectifier 43 and in turn is fed into a low pass filter 44. As shown in FIG. 17, the system 30 can include more than one source 6. Not all the sources 6 need be of the same type.

Thus, the input signal 8 is fed into the nanoscale resonator ensemble 23 which oscillates and the output is filtered to remove the low-frequency component and the resulting signal is detected using the diode detector which outputs a signal 17 which is subsequently used in summing or a signal 17' which is subsequently used in multiplying.

Figure 18:
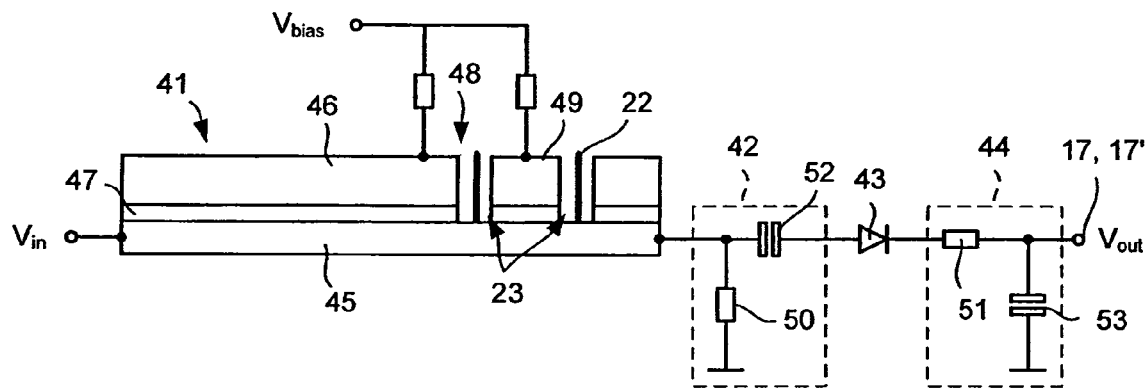
FIG. 18 is a more detailed view of a transmission line and signal conditioning and processing circuit shown in FIG. 17.
Figure 19:
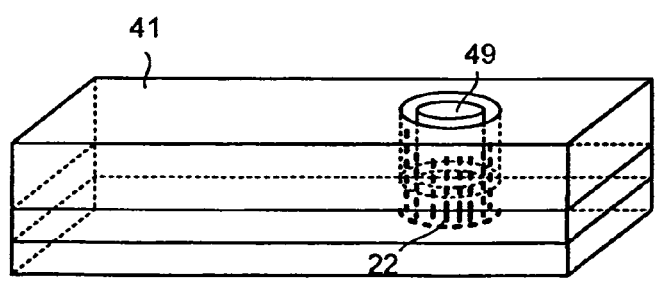
FIG. 19 is a perspective view of the transmission line and a nanoscale resonator ensemble shown in FIG. 18.

Referring to FIGS. 18 and 19, the nanoscale resonator ensemble 23 can be incorporated into the transmission line 41. The transmission line 41 includes a first strip 45 of conductive material, e.g. a highly doped semiconductor, such as silicon, and an overlying strip 46 of the same or different conductive material separated by a layer 47 of dielectric material, such as silicon dioxide. An annular space 48 is formed, e.g. by reactive ion etching, to define a central electrode 49. In the annular space 48, a nanoscale resonator ensemble 23 is formed comprising nanoscale resonator elements 22 in the form of upstanding carbon nanotubes. In some embodiments, the nanoscale resonator elements 22 are silicon nanowires. The nanoscale resonator elements 22 may be formed by depositing a layer of metal, such as iron, which provides a catalyst and growing the nanoscale resonator elements by chemical vapor deposition.

The diameter of the central electrode 49 is about 1 to 100 µm. The width of the annular space 48 is about 0.1 to 10 µm.

A bias voltage can be applied to the central electrode 49 to control the electrical and/or mechanical properties of the resonator ensemble 23.

Resistors 50, 51 and capacitors 52, 53 forming the low-pass and high-pass filters 44, 42 are formed using doped semiconductor tracks. The diode 43 comprises a p-n junction formed, for example by implanting n-type impurity into a p-type substrate.

Figure 20:
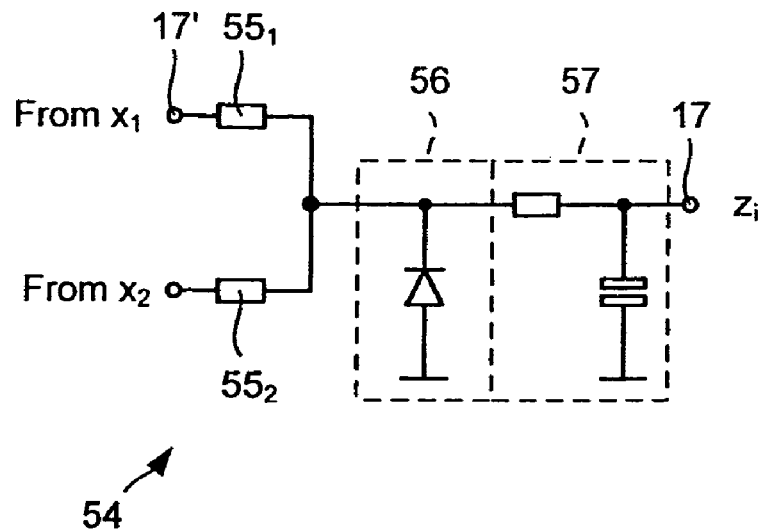
FIG. 20 is a diode multiplier circuit.

Referring to FIG. 20, output signals $x_1$, $x_2$ originating from different nanoscale ensembles 23 can be multiplied using a diode multiplier 54 comprising resistors $55_1$, $55_2$ which weight the signals $x_1$, $x_2$, a rectifier 56 and low-pass filter 57.

Figure 21:
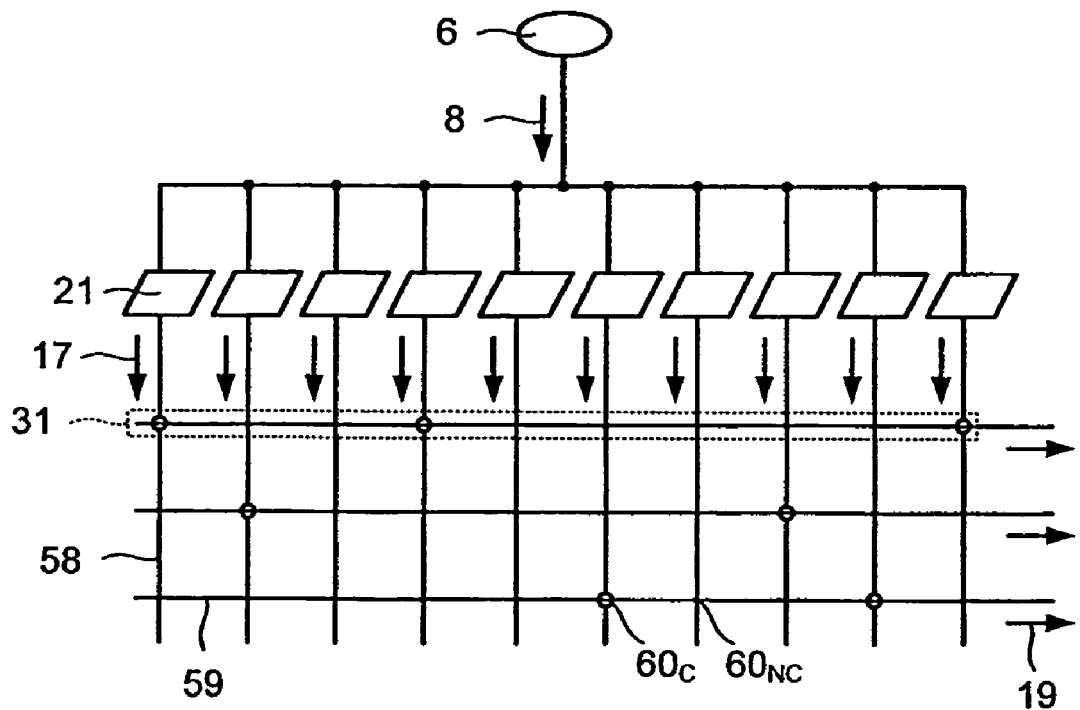
FIG. 21 illustrates a simplified schematic view of the structure of apparatus for classifying data received from one signal source in accordance with certain embodiments of the present invention.
Figure 22:
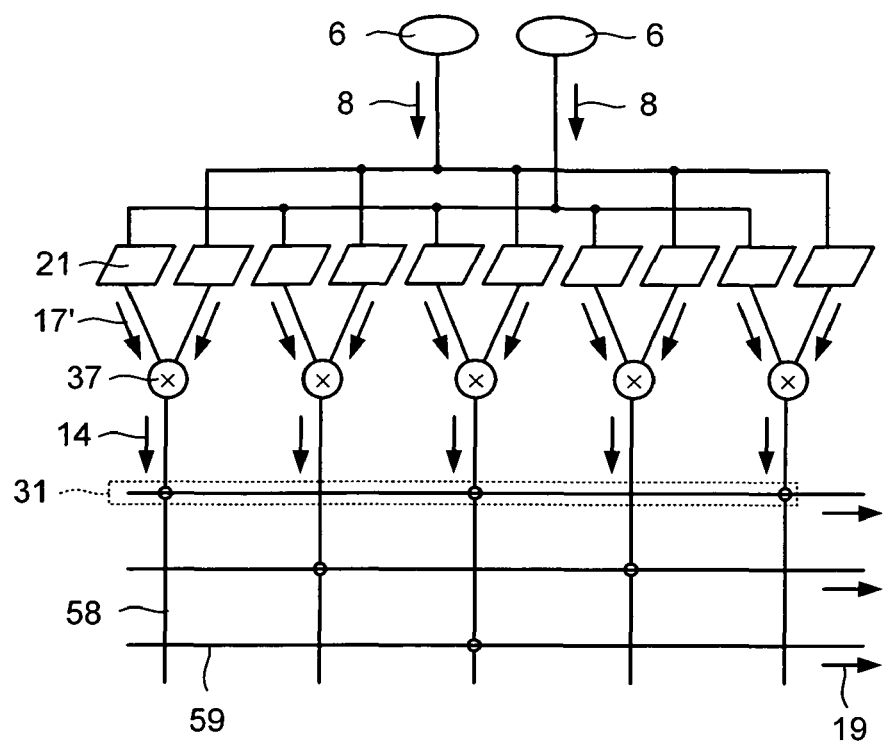
FIG. 22 illustrates a simplified schematic view of the structure of apparatus for classifying data received from two signal sources in accordance with certain embodiments of the present invention.

Referring to FIGS. 21 and 22, output signals 17 are summed by crossing nanowires 58, 59 to form conductive and non-conductive junctions $60_C$, $60_{NC}$. The resistance of the conductive junctions $60_C$ can be varied for example, by adsorbing organic material (e.g. functional molecules) onto the surface of the nanowires 58, 59. Selective absorption or, conversely, desorption of material can be achieved by passing current through the junction at high currents, i.e. to form or, conversely, blow a connection. As explained earlier, the weights can be continuously variable, stepwise variable or binary, i.e. on/off.

Piezoelectric Nanoscale Resonator Elements

As explained earlier, the nanoscale resonator elements 22 may be formed from piezoelectric material. Piezoelectric nanowires can resonate in an applied electric field and an array of piezoelectric nanowires can exhibit synchronized behavior. An array of weakly coupled resonators converges on an oscillatory phase-locked pattern such that the resonators have the same oscillation frequency and constant, but not necessarily equal, phase.

Thus, the amplitude of oscillation of the piezoelectric nanowires can vary according to the Gaussian distribution as a function of input excitation frequency. However, the piezoelectric nanowires converge to oscillate at the same frequency that equals to the input excitation frequency. The array of piezoelectric nanowires converts the input signal into an amplitude that is a function of input signal frequency and amplitude. If the input signal amplitude is normalized, then the output signal depends only on the input signal frequency. However, the input signal need not be normalized.

Using piezoelectric nanowires instead of non-piezoelectric nanowires can have advantages. For example, actuation of piezoelectric nanowires can be more efficient than actuation of non-piezoelectric, capacitively coupled nanowires. Moreover, some piezoelectric nanowires, e.g. ZnO nanowires, can be grown at lower temperatures (e.g. about 70 to 100 or about 400° C.) than some non-piezoelectric nanowires, such as carbon nanotubes. The thickness and length of some types of piezoelectric nanowires, such as ZnO nanowires, can be tightly controlled. Furthermore, compatibility of some types of piezoelectric nanowires with, for example other fabrication processes can be better than some types of non-piezoelectric nanowires, such as carbon nanotubes.

Temperature Compensation

The characteristics of the resonators 23 can vary with temperature. However, temperature dependence can be compensated using an additional temperature sensor having a frequency output. The temperature signal can be added to the classifier and thus it is possible to compensate for temperature changes. The system can also learn the temperature behavior and use the information as a part of the cognitive recognition process.

As explained earlier with reference to FIG. 13, signals from more than one type of source can be incorporated into signal analysis.

Figure 23:
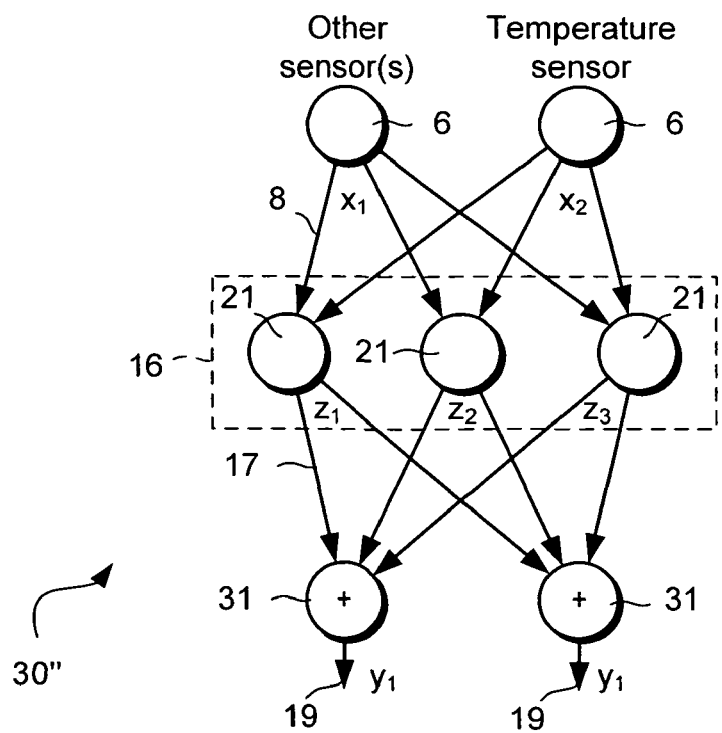
FIG. 23 is a schematic diagram of apparatus for classifying data received a temperature sensor and one or more other types of sensor in accordance with some embodiments of the present invention.

Referring to FIG. 23, an example of the apparatus 30″ (FIG. 13) described earlier is shown which include a temperature sensor 6.

The temperature sensor 6 may be in the form of a resistor or diode whose resistance depends on temperature. The signal from such a sensor is converted into a time-varying signal using a signal converter 9 (FIG. 2).

The temperature sensor 6 may be a resonator 22 comprising nanoscale resonator elements 23 and which is fed back with a signal from the resonator 22 which may be amplified and phase shifted. Thus, the sensor can be operated in a closed loop mode so that the resonant frequency depends only on the temperature of the resonator 22 and thus the system.

The frequency coded, amplitude normalized signal of the temperature sensor 6 is fed into the hidden layer 16, together with the signals 8 of the other sensor(s) 6.

The arrangement can allow temperature dependences of the sensor 6 and hidden layer elements 21 to be compensated.

Single Resonator

Referring to FIG. 24, apparatus 30″ for classifying data from one source 6 using a single resonator 23 in the form of an array of nanoscale resonating elements 22 in accordance with certain embodiments of the present invention is shown.

As explained earlier, more than one transfer function 21 having different resonant modes can be implemented in the same array 23. For example, by applying electric field(s) to different parts of the array 23 and/or by introducing inhomogeneities or variations in dimensions, spacing or materials, an array 23 can exhibit more than one resonant frequency with different parts, e.g. areas or volumes, of the same array responding differently.

Thus, as shown in FIG. 24, an input signal 8 fed into the resonator 23 can result in more than one response 17. Consequently, an overall response 60 of the array includes responses 17 from more than one transfer function 21, i.e. the response 60 is an aggregate of more than one response 17 and, possibly, other unwanted signals. To separate the responses 17 from the aggregate signals 60, filters 61 can be used to select each response. In this example, the filters 61 are band-pass filters centered on the resonant frequencies of the different parts of the array 23, e.g. $f_1$ and $f_2$. However, in some embodiments, a low pass filter and a high pass filter can additionally or alternatively be used.

Once separate responses 17 have been extracted, the responses 17 are fed into a set of adders 31 which weight and sum the weighted signals to produce output signals 19, as described earlier.

Portable Device

Figure 25:
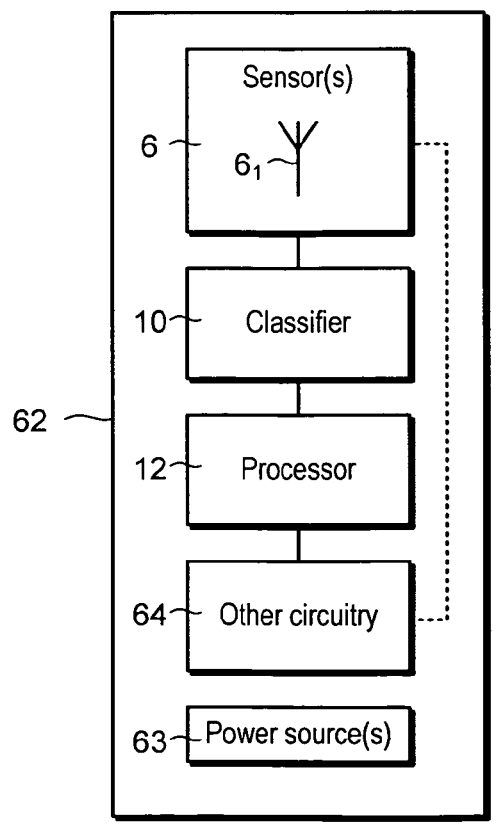
FIG. 25 illustrates a portable device including apparatus for classifying data in accordance with certain embodiments of the present invention.

Referring to FIG. 25, a portable device 62 is shown.

The portable device 62 may be device which is usually held in one hand ("hand-held device") such as mobile communications terminal, personal digital assistant (PDA) or portable media player, a larger-sized device, such as a lap-top computer or other form of device which is usually placed on a surface when operated by a user or a smaller-sized device which need not be held by the user but can be worn, for example on the ear or head, or is embedded in another article, such as another device or clothing.

The portable device 62 may have several functions. For example a mobile communications terminal may provide voice and data communication functions via a public land mobile network (e.g. voice calling, text messaging, e-mailing, web browsing etc via, e.g., a third-generation mobile network), voice and data communication functions via local network (e.g. e-mailing, web browsing via, e.g. a wireless local area network) and may also provide camera and media player functions.

The portable device 62 need not be a consumer item, such as mobile communications terminal, but can be an industrial item, such as an item of testing or monitoring equipment.

The portable device 62 is powered by one or more limited-capacity power source 63, such as a battery and/or photovoltaic cell.

The portable device 62 includes at least one sensor 6, for example include an antenna 6₁, classifier 10 and processor 12 and other circuitry 64 providing appropriate functionality. For example, other circuitry may include a microcontroller, volatile memory, non-volatile memory, an r.f. section, voice coder, display, user input devices (such as touch screen, key pad, pointing device or multi-way controller), a microphone, speaker(s), camera(s), GPS receiver, interfaces to peripheral devices or buses, a (U)SIM card reader and/or (U)SIM card.

It will be appreciated that many modifications may be made to the embodiments hereinbefore described without departing from the spirit and scope of the claimed invention.

The invention claimed is:

1. Apparatus comprising:
   at least one resonator comprising a plurality of nanoscale resonator elements, the at least one resonator having at least two, different resonant frequencies and being configured to provide at least two signals in response to an input signal; and
   at least one adder configured to weight the signals with respective weights and to add weighted signals so as to produce an output signal.

2. Apparatus according to claim 1, wherein the at least one resonator comprises a first resonator comprising the plurality of nanoscale resonator elements and wherein different parts of the first resonator have different resonant frequencies.

3. Apparatus according to claim 2, wherein the resonator comprises an array of nanoscale resonator elements.

4. Apparatus according to claim 1, comprising:
   at least two bandpass filters configured to extract the at least two signals from an aggregate signal.

5. Apparatus according to claim 1, comprising:
   at least two resonators, each resonator comprising a plurality of nanoscale resonator elements and each resonator being configured to provide a signal in response to the input signal.

6. Apparatus according to claim 5, wherein the resonators comprises respective arrays of nanoscale resonator elements.

7. Apparatus according to claim 1, wherein the plurality of nanoscale resonator elements comprise a plurality of nanowires.

8. Apparatus according to claim 1, wherein the input signal is frequency coded, or has normalized amplitude, or both.

9. Apparatus according to claim 1, wherein the input signal is relatively high frequency and the responses are relatively low frequency.

10. Apparatus according to claim 1, wherein the plurality of nanoscale resonator elements comprise a piezoelectric material.

11. Apparatus according to claim 10, wherein the piezoelectric material comprises zinc oxide or barium titanate.

12. Apparatus according to claim 1, wherein the plurality of nanoscale resonator elements comprise a plurality of nanotubes upstanding from a base and, optionally, wherein the nanotubes comprise carbon nanotubes.

13. Apparatus according to claim 1, wherein the plurality of nanoscale resonators comprise a plurality of two-dimensional conductive sheets and wherein, optionally, the plurality of two-dimensional conductive sheets comprise graphene.

14. Apparatus according to claim 1, wherein the resonator or each respective resonator has a natural resonant frequency and variance.

15. Apparatus according to claim 14, wherein at least one resonant frequency, or variance, or both is or are programmable.

16. Apparatus according to claim 15, wherein the apparatus comprises:
   a gate configured to apply an electric field to a resonator so as to program the resonant frequency, variance, or both.

17. Apparatus according to claim 16, wherein the apparatus comprises:
   a heater configured to cause change in phase of at least some of the nanoscale resonator elements so as to program the resonant frequency, or variance, or both.

18. Apparatus according to claim 5, comprising:
   at least two transmission lines, each transmission line coupled to a respective resonator.

19. Apparatus according to claim 5, wherein:
   the at least two resonators are configured to receive the same input signal.

20. Apparatus according to claim 1, further comprising:
   at least one multiplier, the at least one multiplier or each respective multiplier configured to combine signals and to provide a combined signal to an adder.

21. Apparatus according to claim 20, wherein the multiplier is a diode multiplier.

22. Apparatus according to claim 1, wherein each adder comprises a respective programmable junction.

23. Apparatus according to claim 1, wherein each respective adder comprises a respective junction between two conductive lines.

24. Apparatus according to claim 23, wherein the conductive lines comprise nanowires.

25. Apparatus according to claim 23, wherein the junction is configured to have a value of coupling constant which is continuously variable.

26. Apparatus according to claim 23, wherein the junction is configured to have a value of coupling constant which is switchable between at least two discrete values.

27. Apparatus according to claim 23, wherein the junction includes functional molecules.

28. A module, comprising:
   at least one input terminal for receiving at least one respective input signal; and
   the apparatus according to claim 1, the apparatus configured to receive the at least one respective input signal and to output at least one signal classifying the at least one respective input signal.

29. A device comprising:
   a circuit configured to provide a frequency coded signal; and
   a module according to claim 28 configured to receive the frequency coded signal and to output a signal classifying the frequency coded signal.

30. Apparatus comprising:
   a digital processor;
   a classifier comprising apparatus according to claim 1; and
   at least one input signal source configured to provide at least one input signal to the classifier and the classifier configured to pass an output to the digital processor.

31. Apparatus according to claim 30 wherein the digital processor is configured to determine at least one parameter for the classifier.

32. Apparatus according to claim 31 wherein the digital processor is configured to configure the classifier in dependence upon the at least one classifier.

33. Apparatus comprising:
   at least one resonating means comprising a plurality of nanoscale resonating means, the at least one resonating means having at least two, different resonant frequencies and configured to provide at least two signals in response to an input signal; and at least one adding means configured to weight the signals with respective weights and to add weighted signals so as to produce an output signal.

34. A method comprising:

classifying an input signal using at least one resonator comprising a plurality of nanoscale resonator elements having at least two, different resonant frequencies;

weighting the signals with respective weights; and adding weighted signals so as to produce an output signal.

35. A method according to claim 34 comprising:

measuring a temperature of a resonator; and providing a signal dependent upon the temperature to the resonator.

* * * * *